United States Patent
Alibek et al.

(10) Patent No.: US 11,691,915 B2
(45) Date of Patent: Jul. 4, 2023

(54) CONCRETE COMPOSITIONS AND METHODS FOR PRODUCING SAME

(71) Applicant: Locus Solutions IPCo, LLC, Solon, OH (US)

(72) Inventors: Ken Alibek, Solon, OH (US); Sean Farmer, Ft. Lauderdale, FL (US); Sergey Kravtsov, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 48 days.

(21) Appl. No.: 17/181,422

(22) Filed: Feb. 22, 2021

(65) Prior Publication Data

US 2021/0261459 A1 Aug. 26, 2021

Related U.S. Application Data

(60) Provisional application No. 62/979,161, filed on Feb. 20, 2020.

(51) Int. Cl.
| | |
|---|---|
| *C04B 24/10* | (2006.01) |
| *C04B 28/04* | (2006.01) |
| *C04B 14/06* | (2006.01) |
| *C04B 103/40* | (2006.01) |
| *C04B 103/00* | (2006.01) |

(52) U.S. Cl.
CPC .............. *C04B 24/10* (2013.01); *C04B 14/06* (2013.01); *C04B 28/04* (2013.01); *C04B 2103/0001* (2013.01); *C04B 2103/40* (2013.01)

(58) Field of Classification Search
CPC ....... C04B 14/06; C04B 14/22; C04B 18/141; C04B 18/167; C04B 24/10; C04B 28/02; C04B 28/04; C04B 38/02; C04B 38/10; C04B 2103/0001; C04B 2103/10; C04B 2103/302; C04B 2103/304; C04B 2103/32; C04B 2103/40; C04B 2103/406; C04B 2103/58; C04B 2103/603; C04B 2103/61; C04B 2111/0075; Y02W 30/91

See application file for complete search history.

(56) References Cited

U.S. PATENT DOCUMENTS

| | | |
|---|---|---|
| 2012/0184654 A1 | 7/2012 | Hasinovic et al. |
| 2015/0291475 A1 | 10/2015 | Pei |
| 2016/0221884 A1 | 8/2016 | Gandelman et al. |
| 2017/0037301 A1 | 2/2017 | Alwattari |
| 2020/0031715 A1* | 1/2020 | Madduri ................. C04B 28/02 |

FOREIGN PATENT DOCUMENTS

| | | | |
|---|---|---|---|
| DE | 259395 A1 * | 8/1988 | |
| JP | 2016216302 A * | 12/2016 | |
| KR | 10-2009-0108684 A * | 10/2009 | |
| KR | 10-0994315 B1 * | 11/2010 | |
| KR | 10-1620074 B1 * | 5/2016 | ............. C04B 14/38 |
| KR | 10-2017039394 A * | 4/2017 | ........... H01L 25/167 |
| WO | 2016145190 A1 | 9/2016 | |

* cited by examiner

*Primary Examiner* — Anthony J Green
(74) *Attorney, Agent, or Firm* — Saliwanchik, Lloyd & Eisenschenk

(57) ABSTRACT

This present invention relates to compositions to improve concrete using biochemical-producing microbes and/or byproducts synthesized by the microbes. The invention also relates to methods for enhancing the performance of the concrete with said microbial strains and/or their byproducts.

17 Claims, No Drawings

CONCRETE COMPOSITIONS AND METHODS FOR PRODUCING SAME

CROSS-REFERENCE TO RELATED APPLICATION

This application claims priority to U.S. Provisional Patent Application No. 62/979,161, filed Feb. 20, 2020, which is incorporated by reference herein in its entirety.

BACKGROUND OF THE INVENTION

Concrete is one of the most common building materials, far more common than steel, plastics, or wood. The current method of producing concrete is based on mixing cement, sand, and water with additional chemicals that modify the properties of the concrete. One example of an additive is a chemical surfactant that acts as a plasticizer. This use of plasticizers is especially valuable when producing high-strength concrete and fiber-reinforced concrete.

Increasing the water concentration in a concrete mixture, decreases concrete strength. A 1% increase in water concentration decreases the ultimate strength of the concrete by 5%. However, without adequate water in the concrete mixture, the concrete cannot flow or be manipulated to the desired form.

Concrete plasticizers are added to concrete to reduce the amount of water required for manipulation. The plasticizers are typically added in concentrations from 0.1% to 0.4%. At these concentrations of plasticizers, the water required to maintain concrete plasticity is reduced by 5% to 15%.

The cultivation of microorganisms, such as bacteria, yeast or fungi, is important for the production of a wide variety of useful bio-preparations. Microorganisms play crucial roles in, for example, the food industry, pharmaceutical industry, agriculture, mining, environmental remediation, and waste management. There exists an enormous potential for the expanded use of microbes in a broad range of industries.

Interest in microbial biosurfactants has been steadily increasing due to their diversity, environmentally-friendly nature, selectivity, performance under extreme conditions, and potential applications in environmental protection. Biosurfactants are microbially-sourced chemicals that reduce the interfacial tension between phases. Sophorolipids (SLP) are biosurfactants belonging to the class of glycolipids produced by non-pathogenic yeast. SLPs can be used in agriculture, food preservation, biomedicine, cosmetics, and other industries.

SUMMARY OF THE INVENTION

The subject invention provides unique and advantageous uses of microbes, as well as the byproducts of their growth, such as biosurfactants. In specific embodiments, the subject invention provides a microbe-based product, as well as its uses in improved concrete compositions.

Specifically, in preferred embodiments, the subject invention provides cost-effective, environmentally-friendly approaches to improving various properties of concrete. Advantageously, these methods can be practiced over a wide range of environmental conditions, including under water and in regions with significant temperature changes.

In certain embodiments, the subject invention provides compositions for improving various properties of concrete through an application of microorganisms and/or their growth byproducts. The microorganisms and/or their growth byproducts can be added to the water, cement, and aggregates, and other required elements of concrete products, during the initial mixing of the concrete. Alternatively, the microorganisms and/or byproducts of growth can be applied at any point after the initial pour of concrete, including once the concrete has set entirely.

In certain embodiments, the present invention utilizes yeast strains and/or byproducts of their growth. In one embodiment, the microbe used in the compositions and methods of the subject invention is a biosurfactant-producing yeast. The invention provides, for example, a microbe-based product comprising cultivated *Starmerella bombicola* ATCC 22214 and/or products of the growth of that microbe. In addition, the invention provides a microbe-based product comprising cultivated *Wickerhamomyces anomalus* and/or its growth byproducts. The microbes can be in various stages of growth, including vegetative or spore form.

In certain embodiments, the present invention further comprises one or more additional components, such as, for example, accelerators, bonding agents, corrosion inhibitors, air entraining agents, crystalline admixtures, pigments, plasticizers, superplasticizers, pumping aids, retarders, water-reducing admixtures, shrinkage reducers, hydration-control admixtures, alkali-silica reactivity inhibitors, damp-proofing admixtures, permeability reducing admixtures, gas-forming admixtures, anti-washout admixtures, foaming admixtures, and/or workability admixtures.

In certain embodiments, the subject invention provides methods of increasing the performance of the concrete, wherein a composition according to the subject invention comprising a microbe culture and/or microbial growth byproduct is added to a concrete mixture and/or applied to the surface of curing or cured concrete. The performance of the concrete can be enhanced by, for example, decreasing the amount of water used in the concrete composition, increasing the plasticity of the concrete, decreasing the porosity of the concrete, modifying the curing time of concrete, and/or increasing tolerance to biotic and/or, abiotic stresses.

DETAILED DESCRIPTION OF THE INVENTION

The subject invention provides advantageous uses for microbes, as well as byproducts of their growth, such as biosurfactants. In certain embodiments, the subject invention provides microbe-based products, as well as their use in improved concrete compositions.

In specific embodiments, the methods and compositions described herein utilize microbes and/or microbial growth byproducts as admixtures to concrete. In one embodiment, the microbe used in the methods of the subject invention is a biosurfactant-producing yeast.

In certain embodiments, the present invention utilizes yeast strains and/or byproducts of their growth. The invention provides, for example, a microbe-based product comprising, for example, a cultivated *Wickerhamomyces anomalus* yeast, and/or its growth byproducts. In addition, the invention provides a microbe-based product comprising a cultivated *Starmerella* clade yeast, preferably *Starmerella* (*Candida*) *bombicola*, and/or its growth byproducts.

In preferred embodiments, the subject invention provides a method for improving one or more properties of concrete by applying one or more microorganisms and/or microbially-sourced biosurfactants to the concrete. In specific embodiments, the method comprises applying one or more biosurfactants derived from yeast strains, such as *Starmerella bombicola* or *Wickerhamomyces anomalus* to concrete.

In certain embodiments, the method may also comprise applying the microorganisms themselves and/or byproducts thereof with one or more admixtures traditionally used in concrete.

In specific embodiments, the methods and compositions described herein utilize microbial growth byproducts as applied products during or after concrete curing. The microbes and/or byproducts can penetrate into the concrete or they can remain on the surface of the concrete.

In one embodiment, the composition according to the subject invention is obtained through cultivation processes ranging from small to large scales. These cultivation processes include, but are not limited to, submerged cultivation/fermentation, surface cultivation, solid state fermentation (SSF), and combinations thereof.

Advantageously, the present invention can be used without releasing large quantities of inorganic compounds into the environment. Additionally, the compositions and methods utilize components that are biodegradable and toxicologically safe. Thus, the present invention can be used in all possible coatings (and others applications) as a "green" treatment.

Selected Definitions

As used herein, reference to a "microbe-based composition" means a composition that comprises components that were produced as the result of the growth of microorganisms or other cell cultures. Thus, the microbe-based composition may comprise the microbes themselves and/or byproducts of microbial growth. The cells may be in a vegetative state or in spore form, or a mixture of both. The cells may be planktonic or in a biofilm form, or a mixture of both. The byproducts of growth may be, for example, metabolites, cell membrane components, expressed proteins, and/or other cellular components. The cells may be intact or lysed. In some embodiments, the cells are present, with broth in which they were grown, in the microbe-based composition. The cells may be present at, for example, a concentration of at least $1\times10^4$, $1\times10^5$, $1\times10^6$, $1\times10^7$, $1\times10^8$, $1\times10^9$, $1\times10^{10}$, or $1\times10^{11}$ or more cells per milliliter of the composition.

The subject invention further provides "microbe-based products," which are products that are to be applied in practice to achieve a desired result. The microbe-based product can be simply a microbe-based composition harvested from a microbe cultivation process. Alternatively, the microbe-based product may comprise further ingredients that have been added. These additional ingredients can include, for example, buffers, appropriate carriers, such as water, added nutrients to support further microbial growth, and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

As used herein, an "isolated" or "purified" biosurfactant or other microbially-sourced biochemical is substantially free of other compounds, such as cellular material, with which it is associated in nature. As used herein, reference to "isolated" means that the strain is removed from the environment in which it exists in nature. Thus, the isolated strain may exist as, for example, a biologically pure culture, or as spores (or other forms of the strain).

A "metabolite" refers to any substance produced by metabolism (e.g., a growth by-product) or a substance necessary for taking part in a particular metabolic process. Examples of metabolites include, but are not limited to, biosurfactants, biopolymers, enzymes, acids, solvents, alcohols, proteins, vitamins, minerals, microelements, and amino acids.

By "modulate" is meant alter (increase or decrease). Such alterations are detected by standard art known methods such as those described herein.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

By "reduces" is meant a negative alteration of at least 1%, 5%, 10%, 25%, 50%, 75%, or 100%.

By "increases" is meant a positive alteration of at least 1%, 5%, 10%, 25%, 50%, 75%, or 100%.

By "reference" is meant a standard or control condition.

As used herein, a "biofilm" is a complex aggregate of microorganisms, such as bacteria, wherein the cells adhere to each other and/or to a surface using an extracellular polysaccharide matrix. The cells in biofilms are physiologically distinct from planktonic cells of the same organism, which are single cells that can float or swim in liquid medium.

As used herein, "surfactant" refers to a compound that lowers the surface tension (or interfacial tension) between two liquids or between a liquid and a solid. Surfactants act as, for example, detergents, wetting agents, emulsifiers, foaming agents, and/or dispersants. A surfactant produced by microorganisms is referred to as a "biosurfactant."

As used herein, a "biotic stress" is a pressure on the composition and/or object that is the result of a living organism, such as bacteria, fungi, or barnacles. A "biotic stressor" differs from an "abiotic stressor" in that an "abiotic stressor" is the result of non-living factors such UV radiation, freeze-thaw cycling, or saltwater.

As used herein, "accelerators," "cement accelerators," "accelerating admixtures," and "concrete accelerators" are components used in concrete, cement, mortar, renderings, or screeds that expedites the setting time of a concrete composition. Accelerators can be used to offset the effects of inclement weather that can delay setting time or damage the concrete, particularly cold weather, with or without precipitation. Some examples of accelerators are calcium nitrate, calcium nitrite, calcium formate, calcium chloride, triethanolamine, and sodium thiocyanate.

As used herein, "bonding agents," "adhesives," "resins," and "epoxies" are components used in concrete that can bind the concrete to existing structures such as concrete, plaster, and stucco. Without a bonding agent, the new concrete is not able to adhere to cured concrete structures. Some examples of bonding agents are polyvinyl chloride, polyvinyl acetate, acrylics, and butadiene-styrene copolymers.

As used herein, "corrosion inhibitors" are components used in concrete that can prevent premature failure of reinforced concrete by limiting the reaction of chlorides and atmospheric $CO_2$ with cement. Chloride from sources such as de-icing salt can reach the embedded steel, creating rust. Some examples of corrosion inhibitors include aminoalcohols, calcium nitrites, and sodium monofluorophosphates.

As used herein, "air entraining agents" are compounds used in concrete to create tiny air bubbles in the composition. The air entraining agents facilitate the development of air pockets in the concrete to increase the durability by allowing the air to expand and condense during temperature cycling, improve the workability and cohesiveness of the concrete, and reduce the segregation and bleeding of the concrete. Air entraining agents include salts of wood resins, synthetic detergents, salts of sulfonated lignin, salts of petroleum acids, salts of proteinaceous material, fatty and resinous acids and their salts, alkylbenzene sulfonates, and salts of sulfonated hydrocarbons.

As used herein, "crystalline admixtures" or "permeability reducers" lower the permeability of concrete to which it is added. In certain instances, the concrete may become nearly impermeable to water with the addition of an appropriate amount of the crystalline admixture. Some examples of crystalline admixtures include latex and calcium stearate.

As used herein, "plasticizers," "superplasticizers," "workability admixtures," and "water-reducing admixtures" are added to concrete to reduce the amount of water required for manipulation, increase the flowability, and/or reduce the water to cement ratio. Some examples of chemical plasticizers include lingo sulfates, polygluco esters, carbohydrates, and hydroxylated carboxylic acid. Superplasticizers also exist, including modified lignosulfates, sulfonated naphthalene formaldehyde, which are superior to plasticizers in their ability to allow for the workability of the concrete with up to a 30% reduction in water.

As used herein, "pumping aids" are lubricating substances that allow the concrete to flow readily through pipes, channels, drums, or other objects for concrete transport or holding chambers. Some examples of pumping aids including organic and synthetic polymers, organic flocculants, organic emulsions of paraffin, coal tar asphalt, acrylics, bentonite and pyrogenic silica, and hydrated lime.

As used herein, "retarders" are substances that slow the setting time of concrete. Some examples of retarders include lignin, borax, sugars, and tartaric acid and salts. Similarly, "hydration-control admixtures" also slow the setting time of the concrete, but the hydration-control mixture is often more forgiving after the evaporation process begins. Hydration-control admixtures can be compared to a time-released capsule.

According to the subject invention, as the concrete sets, "shrinkage reducers" limit the contraction of the concrete. Some examples of shrinkage reducers include polyoxyalkylene alkyl ether and propylene glycol.

As used herein, "alkali-silica reactivity inhibitors" inhibit the swelling that can occur throughout the lifespan of concrete by inhibiting the reaction between the alkaline cement paste and silica. Sodium silicate results from the reaction, producing a hygroscopic gel that increases in volume when exposed to water. Some examples of alkali-silica reactivity inhibitors include barium salt, lithium nitrate, lithium carbonate, and lithium hydroxide.

As used herein, "damp-proofing" admixtures prevent or hinder moisture penetration into the concrete. Damp-proofing is generally used to keep moisture from the surrounding environments from penetrating the concrete. These sources of moisture could be soil or sand surrounding the concrete of a basement wall, concrete slab, or a sidewalk. Damp-proofing is often in the form of an exterior coating to the concrete as opposed to additive mixed throughout concrete composition. Some materials that can be used to damp proof concrete include soaps of calcium or ammonium stearate, soaps of calcium or ammonium oleate, butyl stearate, and various petroleum products.

As used herein, "waterproofing" admixtures are similar to damp-proofing but are designed to prevent penetration by liquid water, particularly in environments with high water tables, frequent flooding, or in pools. Water proofing materials are also applied to the exterior surface of the concrete. Some materials that can be used to water proof concrete include rubberized asphalt coatings, bentonite, rubber-based coatings, and urethane coatings.

As used herein, "gas-forming" admixtures are substances responsible for expanding the concrete before it cures. The most common gas-forming admixtures are aluminum powder, activated carbon, and hydrogen peroxide. These added chemicals form bubbles of hydrogen gas in the concrete. In addition to counteracting settling on concrete, the presence of the hydrogen gas can also counteract concrete bleeding. Concrete bleeding is when water is pushed upward and the more dense cement particles sink down. Gas-forming admixtures can also create lightweight concrete.

As used herein, "anti-washout" admixtures are often added to concrete destined for underwater use in order to alleviate the effects of water pressure and friction caused by the movement of water. The anti-washout admixtures improve the cohesiveness of the concrete and preventing cement paste from washing away. The concrete can be self-compacting. Cellulose and acrylic polymers can be used in anti-washout composition.

As used herein, "foaming" admixtures create a lighter, less dense concrete by adding surfactants or other chemicals, such as hydrolyzed proteins, to concrete compositions. Concrete with foaming admixtures are often used for void filling, as opposed to structural support.

As used herein, an "aggregate" or "construction aggregate" is one of the three basic components to create concrete, along with water and cement. Aggregate is the particulate material. Aggregates usually make up the majority of the concrete composition, and include sand, stone, gravel, glass, silica, blast furnace slag, recycled concrete, rock, or other related components.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates embodiments that "consist" or "consist essentially" of the recited element(s).

Unless specifically stated or obvious from context, as used herein, the term "or" is understood to be inclusive. Unless specifically stated or obvious from context, as used herein, the terms "a," "an" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

Yeast Strains According to the Subject Invention

In preferred embodiments, the subject invention utilizes biochemical-producing yeast. The yeast may be natural or genetically modified microorganisms. For example, the yeast may be transformed with specific genes to exhibit specific characteristics. The yeast may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

Examples of yeast and fungus species suitable for use according to the current invention, include, but are not limited to, *Acaulospora, Aspergillus, Aureobasidium* (e.g., *A. pullulans*), *Blakeslea, Candida* (e.g., *C. albicans, C. apicola*), *Cryptococcus, Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Meyerozyma* (e.g., *M. guilliermondii*), *Penicillium, Phythium, Phycomyces, Pichia* (e.g., *P. anomala, P. guilliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W. anomalus*), *Williopsis*, and *Zygosaccharomyces* (e.g., *Z. bailii*).

In some embodiments, the yeast is a "killer yeast," which means a strain of yeast characterized by its secretion of toxic proteins or glycoproteins, to which the strain itself is immune. The exotoxins secreted by killer yeasts are capable of killing, for example, other strains of yeast, fungi, or bacteria. Killer yeasts can include, but are not limited to, *Wickerhamomyces* spp. (*W. anomalus*), *Pichia, Hansenula, Saccharomyces, Hanseniaspora,* (*Hanseniaspora uvarum*), *Ustilago maydis, Debaryomyces hansenii, Candida* spp. (*C. albicans, C. rugosa, C. tropicalis, C. lipolytica, C. torulopsis*), *Starmerella* spp. (*S. bombicola*), *Cryptococcus, Kluyveromyces, Torulopsis, Ustilago, Williopsis, Zygosaccharomyces,* and others.

In certain embodiments, the microorganism is a *Starmerella* spp. yeast and/or *Candida* spp. yeast, e.g., *Starmerella* (*Candida*) *bombicola, Candida apicola, Candida batistae, Candida floricola, Candida riodocensis, Candida stellate* and/or *Candida kuoi*. In a specific embodiment, the microorganism is *Starmerella bombicola*, e.g., strain ATCC 22214.

In certain preferred embodiments, the microorganism is *Wickerhamomyces anomalus*.

Other microbial strains including, for example, other fungal strains capable of accumulating significant amounts of, for example, glycolipid biosurfactants or other useful metabolites, such as carbohydrates, polyols, lipids, esters, and/or proteins, can be used in accordance with the subject invention. Other metabolites and/or microbial components useful according to the present invention include mannoprotein, beta-glucan and others that have bio-emulsifying and surface/interfacial tension-reducing properties.

Growth of Yeasts According to the Subject Invention

The subject invention utilizes methods for cultivation of microorganisms and production of microbial metabolites and/or other byproducts of microbial growth. The microbial cultivation systems would typically use submerged culture fermentation; however, surface culture and hybrid systems can also be used.

As used herein "fermentation" refers to growth of cells under controlled conditions. The growth could be aerobic or anaerobic. Unless the context requires otherwise, the phrase is intended to encompass both the growth phase and product biosynthesis phase of the process.

As used herein, a "broth," "culture broth," or "fermentation broth" refers to a culture medium comprising at least nutrients. If the broth is referred to after a fermentation process, the broth may comprise microbial growth byproducts and/or microbial cells as well.

In one embodiment, the subject invention provides materials and methods for the production of biomass (e.g. viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. As used herein, the term "reactor," "bioreactor," or "fermentation reactor" includes a fermentation device consisting of one or more vessels and/or towers or piping arrangements. Examples of such reactor includes, but are not limited to, the Continuous Stirred Tank Reactor (CSTR), Immobilized Cell Reactor (ICR), Trickle Bed Reactor (TBR), Bubble Colunm, Gas Lift Fermenter, Static Mixer, or other vessel or other device suitable for gas-liquid contact. In some embodiments, the bioreactor may comprise a first growth reactor and a second fermentation reactor. As such, when referring to the addition of substrate to the bioreactor or fermentation reaction, it should be understood to include addition to either or both of these reactors where appropriate.

In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g. measurement of cell number and growth phases). Alternatively, a daily sample may be taken from the vessel and subjected to enumeration by techniques known in the art, such as dilution plating technique. Dilution plating is a simple technique used to estimate the number of cells in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method of cultivation can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, rice bran oil, olive oil, corn oil, sesame oil, and/or linseed oil. These carbon sources may be used independently or in a combination of two or more.

In one embodiment, growth factors and trace nutrients for microorganisms are included in the medium. In one embodiment, inorganic salts may also be included. In certain embodiments, the method for cultivation may further comprise adding additional acids and/or antimicrobials in the liquid medium before, and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The microbes can be grown in planktonic form or as biofilm. In the case of biofilm, the vessel may have within it a substrate upon which the microbes can be grown in a biofilm state. The system may also have, for example, the capacity to apply stimuli (such as shear stress) that encourages and/or improves the biofilm growth characteristics.

In one embodiment, the method for cultivation of microorganisms is carried out at about 5° C. to about 100° C., preferably, 15° C. to 60° C., more preferably, 25° C. to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

The biomass content of the fermentation broth may be, for example from 5 g/l to 180 g/l or more. In one embodiment, the solids content of the broth is from 10 g/l to 150 g/l.

In one embodiment, the subject invention further provides a method for producing microbial metabolites such as ethanol, polyols, esters, lactic acid, beta-glucan, proteins, peptides, metabolic intermediates, polyunsaturated fatty acids, biosurfactants, and lipids. The metabolite content produced by the method can be, for example, at least 20%, 30%, 40%, 50%, 60%, 70%, 80%, or 90%.

The microbial growth byproduct produced by microorganisms of interest may be retained in the microorganisms or secreted into the liquid medium. In another embodiment, the method for producing microbial growth byproduct may further comprise steps of concentrating and purifying the microbial growth byproduct of interest. In a further embodiment, the liquid medium may contain compounds that stabilize the activity of microbial growth byproduct.

In preferred embodiments, the microbial growth byproduct is a biosurfactant. Specific biosurfactants according to the subject invention include, for example, low-molecular-weight glycolipids (GLs), lipopeptides (LPs), flavolipids (FLs), phospholipids, and high-molecular-weight polymers such as lipoproteins, lipopolysaccharide-protein complexes, and polysaccharide-protein-fatty acid complexes.

In one embodiment, the microbial biosurfactant is a glycolipid such as a rhamnolipid (RLP), sophorolipid (SLP), trehalose lipid or mannosylerythritol lipid (MEL). In one embodiment, the microbial biosurfactant is a lipopeptide, such as an iturin, a fengycin or a surfactin.

In one embodiment, the yeast-based composition comprises a blend of any of these biosurfactants. Preferably the blend comprises sophorolipids, and optionally one or more of a mannosylerythritol lipid, a surfactin, an iturin and/or a rhamnolipid.

In certain embodiments, the microbial growth byproducts are carbohydrates, polyols, lipids, glycolipids, esters, and/or proteins. These constituents can be byproducts as waste products of fermentation. The growth byproducts can also be the residue chemicals resulting from yeast cell death.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

The method and equipment for cultivation of microorganisms and production of the microbial byproducts can be performed in a batch, quasi-continuous, or continuous processes.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a cell-free broth or contain cells. In this manner, a quasi-continuous system is created.

Advantageously, the method does not require complicated equipment or high energy consumption. The microorganisms of interest can be cultivated at small or large scale on site and utilized, even being still-mixed with their media. Similarly, the microbial metabolites can also be produced at large quantities at the site of need.

Advantageously, the microbe-based products can be produced in remote locations. The microbe growth facilities may operate off the grid by utilizing, for example, solar, wind and/or hydroelectric power.

Preparation of Yeast-Based Products

One yeast-based product of the subject invention is simply the fermentation broth containing the yeast and/or the microbial metabolites produced by the yeast and/or any residual nutrients. The product of fermentation may be used directly without extraction or purification. If desired, extraction and purification can be easily achieved using standard extraction and/or purification methods or techniques described in the literature.

The yeasts in the yeast-based product may be in an active or inactive form, or a mixture thereof. The yeast-based products may be used without further stabilization, preservation, and storage. Advantageously, direct usage of these yeast-based products preserves a high viability of the microorganisms, reduces the possibility of contamination from foreign agents and undesirable microorganisms, and maintains the activity of the byproducts of microbial growth.

In one embodiment, a first yeast fermentation product, designated as "Star 3+," can be obtained via cultivation of a yeast, e.g., *Wickerhamomyces anomalus*, using a modified form of solid state fermentation. *Wickerhamomyces anomalus* is frequently associated with food and grain production and is an effective producer of various solvents, enzymes, toxins, triglycerides, as well as biosurfactants (e.g., phospholipids). The culture can be grown on a substrate with ample surface area onto which the yeasts can attach and propagate, such as, for example, rice, soybeans, chickpeas, pasta, oatmeal or beans. The entire fermentation medium with yeast cells growing throughout, and any growth by-products thereof (e.g., enzymes, solvents, and/or biosurfactants), can be harvested after, for example, 3-5 days of cultivation at 25-30° C. The culture can be blended with the substrate, milled and/or micronized, and optionally, dried. This comprises the Star 3+ product. The composition, which can comprise, e.g., $1 \times 10^{10}$ to $10^{12}$ cells/gram, can be diluted, for example, up to 10, 50, 100, 500, or 1,000 times prior to being mixed with other components.

In one embodiment, a yeast fermentation product can be obtained via submerged cultivation of *Wickerhamomyces anomalus*. The fermentation broth after 7 days of cultivation at 25-30° C. can contain the yeast cell suspension and, for example, at least 1 to 100 g/L, 2 to 80 g/L, 3 to 60 g/L, 4 to 40 g/L, 5 to 20 g/L or 6 to 10 g/L of biosurfactants.

In one embodiment, the yeast fermentation product can also be obtained via cultivation of the biosurfactant-producing yeast, *Starmerella bombicola*. This species is an effective producer of glycolipid biosurfactants, such as SLP. The fermentation broth after 5 days of cultivation at 25° C. can contain the yeast cell suspension and, for example, at least 1 to 150 g/L, 2 to 120 g/L, 3 to 100 g/L, 4 to 80 g/L, 5 to 60 g/L or 6 to 50 g/L of glycolipid biosurfactants.

In specific embodiments, the biosurfactants of the subject composition comprise one or more glycolipid biosurfactants. In specific preferred embodiments, the glycolipid is a sophorolipid.

Sophorolipids are glycolipid biosurfactants produced by, for example, yeasts of the *Starmerella* clade and in some embodiments, *Wickerhamomyces anomalus*. SLP consist of a disaccharide sophorose linked to long chain hydroxy fatty acids. They can comprise a partially acetylated 2-O-β-D-glucopyranosyl-D-glucopyranose unit attached β-glycosidically to 17-L-hydroxyoctadecanoic or 17-L-hydroxy-Δ9-octadecenoic acid. The hydroxy fatty acid is generally 16 or 18 carbon atoms, and may contain one or more unsaturated bonds. Furthermore, the sophorose residue can be acetylated on the 6- and/or 6'-position(s). The fatty acid carboxyl group can be free (acidic or linear form (General Formula 1)) or internally esterified at the 4"-position (lactonic form (General Formula 2)). *S. bombicola* produces a specific enzyme, called *S. bombicola* lactone esterase, which catalyzes the esterification of linear SLP to produce lactonic SLP.

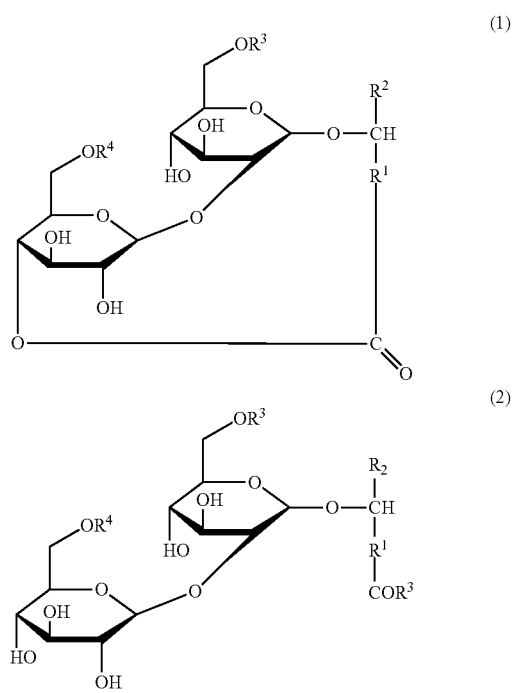

where $R^1$ and $R^{1'}$ independently represent saturated hydrocarbon chains or single or multiple, in particular single, unsaturated hydrocarbon chains having 8 to 20, in particular 12 to 18 carbon atoms, more preferably 14 to 18 carbon atoms, which can be linear or branched and can comprise one or more hydroxy groups, $R^2$ and $R^{2'}$ independently represent a hydrogen atom or a saturated alkyl functional group or a single or multiple, in particular single, unsaturated alkyl functional group having 1 to 9 carbon atoms, more preferably 1 to 4 carbon atoms, which can be linear or branched and can comprise one or more hydroxy groups, and $R^3$, $R^{3'}$, $R^4$ and $R^{4'}$ independently represent a hydrogen atom or an acetyl group.

The sophorolipid may be in a purified form or in a mixture of fermentation products. The sophorolipid may be added to the concrete compositions at concentrations of 0.001 to 90% by weight (wt %), preferably 0.01 to 50 wt %, and more preferably 0.1 to 20 wt %. In another embodiment, purified SLP may be in combination with an acceptable carrier, in that SLP may be presented at concentrations of 0.001 to 50% (v/v), preferably, 0.01 to 20% (v/v), more preferably, 0.02 to 5% (v/v).

The yeast and/or broth resulting from the yeast growth can be removed from the growth vessel and transferred via, for example, piping for immediate use.

The yeast fermentation product can comprise yeast cells and fermentation broth, or it can comprise the fermentation broth separated from the yeast cells. In one embodiment, the biosurfactants or other growth byproducts in the broth are further separated from the broth and purified.

In other embodiments, the composition (yeast, broth, or yeast and broth) can be placed in containers of appropriate size, taking into consideration, for example, the intended use, the contemplated method of application, the size of the fermentation tank, and any mode of transportation from microbe growth facility to the location of use. Thus, the containers into which the yeast-based composition is placed may be, for example, from 1 gallon to 2,000 gallons or more. In other embodiments the containers are 2 gallons, 5 gallons, 25 gallons, 250 gallons, or larger.

In certain embodiments, the compositions of the subject invention have advantages over, for example, biosurfactants alone, including one or more of the following: high concentrations of mannoprotein as a part of yeast cell wall's outer surface (mannoprotein is a highly effective bioemulsifier); the presence of biopolymer beta-glucan (an emulsifier) in yeast cell walls; and the presence of biosurfactants, metabolites and solvents (e.g., lactic acid, ethanol, ethyl acetate, etc.) in the culture.

Other chemicals that are useful according to the present invention include mannoprotein, beta-glucan, ethanol, lactic acid and other metabolites that have, for example, bio-emulsifying and surface/interfacial tension-reducing properties.

In certain embodiments, the microbe culture and/or growth byproduct compositions can be added to concrete. These compositions can be added during initial mixing of the concrete ingredients, or the microbe culture and/or growth byproduct compositions can be added after the initial concrete application, i.e., during or after the curing process.

Concrete has three basic components: water, cement, and an aggregate. The aggregate such as, for example, sand, stone, rock, gravel, recycled concrete, glass, or blast furnace slag, makes up the majority of the concrete, which provides the basic structure of the concrete. In certain embodiments, the aggregates can be one type, such as sand, or a combination of different aggregates, such as, for example, sand, recycled concrete, and glass. Cement is used as an adhesive, binding aggregates to each other. Water is added so that the mixture can made into a homogenous, workable composition. This concrete mixture can be created in a variety of shapes and compositions based on the application.

Various types of admixtures have been added to the concrete mixtures. These include, for example, accelerators, bonding agents, corrosion inhibitors, air entraining agents, crystalline admixtures, pigments, plasticizers, superplasticizers, pumping aids, retarders, water-reducing admixtures, shrinkage reducers, hydration-control admixtures, alkali-silica reactivity inhibitors, damp-proofing admixtures, permeability reducing admixtures, gas-forming admixtures, anti-washout admixtures, foaming admixtures and/or workability admixtures.

In certain embodiments, an accelerator is used in, or with, the microbe culture and/or growth byproduct composition. Calcium chloride, calcium nitrate, calcium nitrite, calcium formate, calcium chloride, triethanolamine, and sodium thiocyanate can be used in concrete composition but often result in corrosion issues, necessitating the use of corrosion inhibitors.

In certain embodiments, corrosion inhibitors are used in, or with, the microbe culture and/or growth byproduct composition. Some examples of corrosion inhibitors include aminoalcohols such as 2-aminomethyl propanol; benzotriazoles such as diethylethanolamine benzotraizole and methyl benzotriazole; calcium nitrites; and sodium monofluorophosphates.

The microbe culture and/or growth byproduct product may be applied with a composition that promotes adherence of the microbe culture and/or growth byproduct product to a surface to be treated. The adhesion-promoting substance may be a component of the microbe culture and/or growth byproduct product or it may be applied sequentially with the yeast-based product. Bonding agents, adhesives, resins, and epoxies are components used in concrete that can bind the concrete to existing structures or bind additional chemicals to the surface of the concrete. Thee bonding agent helps the new concrete to adhere to cured concrete structures. Some examples of bonding agents that can be used in the instant disclosure are polyvinyl chloride, polyvinyl acetate, acrylics, and butadiene-styrene copolymers.

In certain embodiments, air entraining agents can be used in, or with, the microbe culture and/or growth byproduct compositions. Air entraining agents include salts of wood resins, synthetic detergents, salts of sulfonated lignin, salts of petroleum acids, salts of proteinaceous material, fatty and resinous acids and their salts, alkylbenzene sulfonates, and salts of sulfonated hydrocarbons.

In certain embodiments, crystalline admixtures can be used in, or with, the microbe culture and/or growth byproduct compositions, including, for example, latex and calcium stearate.

In certain embodiments, the microbe culture and/or growth byproduct composition of the subject invention comprises a pigment or dye, which can provide the color of paints or other coatings but can additionally protect the surface or object from, for example, UV light. Pigments or dyes can be natural, synthetic, inorganic, or organic. The pigments or dyes can be selected from, for example, titanium dioxide, zin oxide, zinc yellow, yellow dyes, benzidine yellows, chrome oxide green, phthalocyanine green, phthalocyanine blues, ultramarine blue, vermillion, pigment brown 6, red 170, dioxazine violet, carbon black, iron (II) oxide, quartz sand ($SiO_2$), talc, barite ($BaSO_4$), kaoline clay, and limestone ($CaCO_3$).

In certain embodiments, plasticizers, superplasticizers, workability admixtures, and water-reducing admixtures can be added to, or used in conjunction with, the microbe culture and/or growth byproduct composition. Some examples of chemical plasticizers include lingo sulfate, polygluco esters, carbohydrates, and hydroxylated carboxylic acid. Superplasticizers also exist, including, for example, modified lignosulfates, sulfonated naphthalene formaldehyde, which are superior to plasticizers in their ability to allow for the workability of the concrete.

In certain embodiments, pumping aids can be added to, or used in conjunction with, the microbe culture and/or growth byproduct compositions. Some examples of pumping aids include organic and synthetic polymers, organic flocculants, organic emulsions of paraffin, coal tar asphalt, acrylics, bentonite and pyrogenic silicas, and hydrated lime.

In certain embodiments, retarders and hydration-control admixtures can be added to, or used in conjunction with, the microbe culture and/or growth byproduct composition. Some examples of retarders include lignin, borax, sugars, and tartaric acid and salts.

In certain embodiments, shrinkage reducers can be added to, or used in conjunction with, the microbe culture and/or growth byproduct composition, including, for example, polyoxyalkylene alkyl ether and propylene glycol.

Alkali-silica reactivity inhibitors can be used in, or with, the microbe culture and/or growth byproduct composition. Some examples of alkali-silica reactivity inhibitors include barium salt, lithium nitrate, lithium carbonate, and lithium hydroxide.

Damp-proofing or waterproofing admixtures can be used in, or with, the microbe culture and/or growth byproduct composition. Some chemicals that can be used to damp-proof concrete include, for example, soaps of calcium or ammonium stearate, soaps of calcium or ammonium oleate, butyl stearate, and various petroleum products. Water proofing materials are also applied to the exterior surface of the concrete. Some materials that can be used to water proof concrete include rubberized asphalt coatings, bentonite, rubber-based coatings, and urethane coatings.

In certain embodiments, gas-forming admixtures can be added to, or used in conjunction with, the microbe culture and/or growth byproduct compositions. The most common gas-forming admixtures are, for example, aluminum powder, activated carbon, and hydrogen peroxide.

In certain embodiments, anti-washout admixtures can be added to, or used in conjunction with, the microbe culture and/or growth byproduct compositions. Cellulose and acrylic polymers are exemplary substance that can be used in anti-washout admixtures.

In certain embodiments, foaming admixtures can be added to, or used in conjunction with, the microbe culture and/or growth byproduct compositions, including by surfactants and hydrolyzed proteins. In certain embodiments, the concrete composition contains microbial growth byproducts at a concentration of about 0.001% to about 50% by weight or by volume, about 0.01% to about 10%, about 0.05% to about 1%, or about 0.1% to about 0.5%.

In certain embodiments, the composition applied to the surface of concrete contains microbial growth byproducts at a concentration of about 0.001% to about 50% by weight or by volume of the composition, about 0.01% to about 10%, about 0.01% to about 1%, or about 0.1% to about 0.5%.

In certain embodiments, the microbial cells may be present at, for example, a concentration of at least $1\times10^4$, $1\times10^5$, $1\times10^6$, $1\times10^7$, $1\times10^8$, $1\times10^9$, $1\times10^{10}$, or $1\times10^{11}$ or more cells per milliliter in the composition.

Advantageously, in accordance with the subject invention, the microbe culture and/or growth byproduct product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Any compositions or methods provided herein can be combined with one or more of any of the other compositions and methods provided herein.

Other features and advantages of the invention will be apparent from the following description of the preferred embodiments thereof, and from the claims. All references cited herein are hereby incorporated by reference.

Use of Microbes and Their Growth Byproducts in Concrete

The use of concrete comprising compositions according to the subject invention can provide a variety of advantages. To be used in the mixture of concrete, the microbe culture and/or growth byproduct can be added during the initial mixing of the various components of concrete including water, cement, aggregates, and optional admixtures.

Both acidic and lactonic sophorolipids can be used. The mixture between the two types of sophorolipids can be adjusted based on the desired characteristics of each product application. The ratio between sophorolipids and the other components including yeast cells can be modified for each application. The sophorolipids can be purified from the organisms that produced the chemicals and/or the growth medium. Alternatively, the sophorolipids can be used in an unpurified form. The organisms used to produce the biosurfactants can be removed from the composition, while the other components of the growth medium and other byproducts produced by the organisms can remain in the mixture to be added to the concrete composition.

As used herein, "applying" a composition or product refers to contacting it with a target, site or material such that the composition or product can have an effect on that target, site or material. The effect can be due to, for example, microbial growth and/or the action of a biosurfactant or other growth byproduct. For example, the microbe-based compositions or products can be added in liquid or dried form to a concrete mixture at the concrete batch plant and/or at the site of use of the concrete product via pouring, spraying, mixing, spreading, and/or injecting.

When the microbe culture and/or growth byproducts composition is applied to the concrete during or after curing, it can be applied by spraying using, for example, a spray bottle or a pressurized spraying device. The composition can also be applied using a cloth or a brush, wherein the composition is rubbed, spread or brushed onto the surface. Furthermore, the composition can be applied to the surface by dipping, dunking or submerging the surface into a container having the composition therein.

In one embodiment, the material and/or surface is allowed to soak with the composition thereon. For example, soaking can occur for at least 5 seconds, 30 seconds, 1 minute, 30 minutes, 60 minutes, 12 hours, 24 hours, 36 hours, 48 hours, or 72 hours or more, as needed.

In certain embodiments, the microbe culture and/or growth byproducts can improve the concrete by way of increasing the strength of the concrete, decreasing the amount of water used in the concrete composition, increasing the workability of the concrete, decreasing the porosity of the concrete, modifying the speed of concrete setting, and/or increasing the tolerance of the concrete to biotic and abiotic stresses.

Concrete Compositions

The microbe culture and/or growth byproducts composition can be used in common types of concrete/cement used for construction, such as, e.g., Portland cement. Additionally, the microbe culture and/or growth byproduct composition can be used in asphalt concrete that is often used for roads, parking lots, airports, and dams. Pervious concrete, nanoconcrete, microbial concrete, and polymer concrete are all types of concrete that can use the microbe culture and/or growth byproduct as a component of the mixture.

Furthermore, biosurfactants can be used in coatings applied to concrete. Commonly, concrete is coated to seal it from surface damage, corrosion, and staining by preventing penetration by water, salts, and/or air. In certain embodiments, the microbe culture and/or growth byproducts coat the surface only, while, in other embodiments, the microbe culture and/or growth byproducts can penetrate into the concrete as well as remain on the surface.

Enhanced Strength of the Concrete

The strength of concrete is typically inversely proportional to the amount of water in the concrete mixture. A 1% decrease in the concentration of water in concrete increases the strength of the concrete by approximately 5%. However, in some cases, reduced water content reduces the workability of the concrete as well as the curing time.

In accordance with the subject invention, the addition of a microbe culture and/or growth byproducts, preferably sophorolipids and *W. anomalus*, can increase the workability of the concrete without compromising the strength. Plasticizers and superplasticizers are currently used in concrete mixtures to retain the workability of concrete while enhancing concrete strength.

The strength of the concrete can be enhanced, either in combination or distinctly, through a variety of methods. The methods include, but are not limited to, decreasing the amount of water in the concrete composition and decreasing the porosity of concrete. As the water evaporates from the concrete during the setting process, there is a void in the concrete; so, the lesser the void volume, the stronger the concrete. These voids that remain determine the porosity of the concrete. Decreasing the amount of water in the initial concrete mixture with the use of a microbe culture and/or growth byproducts can also decrease the porosity of the concrete. The porosity of concrete can be determined by the concentration of the microbe culture and/or growth byproducts added to concrete, allowing the concrete to maintain its workability while increasing the strength compared to concrete mixtures without microbe cultures and/or growth byproducts.

In certain embodiments, the addition of sophorolipids to a concrete mixture at a concentration of about 0.01% to about 0.5% and yeast cell fermentation waste at a concentration of about 0.1% to about 0.5% can increase the strength of concrete significantly. The yeast cell fermentation waste products can be the result of live or dead yeast cells; therefore, yeast cells can be added at a concentration of about 0.1 g/l to about 100 g/l. With the addition of the yeast cells, sophorolipids, and/or other growth byproducts, water consumption can also be decreased by about 1% to about 50%, about 10% to about 25%, or about 15% to about 20%. This optional reduction of water can also modify the curing time of the concrete.

Modifying the Curing Time of Concrete

With the addition of the microbe culture and/or growth byproduct compositions to the concrete mixture, the curing time can be modified. The concentration of water in the concrete determines the length of curing (with all other variables that affect evaporation being equal). When water concentration is lower, evaporation is faster and curing time is lower, while greater water concentration leads to slower water evaporation and increased curing time. Advantageously, in certain embodiments, addition of the compositions of the subject invention to a concrete mixture can reduce the amount of water required for concrete to remain workable. Thus, in some embodiments, the curing time of concrete can be reduced.

Alternatively, in certain embodiments, by adding the microbe culture and/or growth byproduct composition to a concrete mixture, the curing time can be elongated while retaining or even increasing concrete strength. The concrete is more malleable for a longer period of time.

Increasing the Tolerance of Concrete to Biotic and Abiotic Stress

In certain embodiments, the microbe culture and/or growth byproduct compositions can be added to concrete mixtures or applied to the surface of set or setting concrete to increase the tolerance to environmental stresses. The stresses include biotic stresses, such as bacteria and barnacles, and abiotic stresses, including high and low temperatures, freeze-thaw cycling, salt, high or low pressures, wind, precipitation, waves, water, UV radiation, impurities in the concrete mixture or concrete coatings, hydrostatic pressure, abrasives (such as sand storms), and to the movement of the concrete, e.g. transporting a set concrete slab in a truck.

In certain embodiments, the concrete can resist frost with the addition of a microbe culture and/or growth byproducts. Frost resistance refers to the ability of concrete to maintain its intended use during or after temperature under 0° C. The frost resistance can be achieved by preventing water or moisture penetration of the concrete, thereby preventing ice from forming within the concrete, potentially fracturing the concrete. Additionally, the microbe culture and/or growth byproducts can allow the concrete to resist concrete fractures that result from temperatures below freezing, including to about −30° C., about −15° C., or to about −5° C. because of the lower concentration of water in the composition and/or the increased amount of air entrained within the concrete.

In certain embodiments, the microbe culture and/or growth byproduct composition increases the longevity of the concrete by preventing fouling by living organisms or non-living substances. The subject invention can be used for preventing deposition from occurring.

In certain embodiments, the microbe culture and/or growth byproduct composition seals the concrete from penetration by water, salt, and/or air. The biosurfactant composition can remain on the surface of the concrete or the composition can penetrate the concrete. The penetration can reach a depth of about 0.1% to about 1%, about 0.5% to about 5%, about 1% to about 10%, about 5% to about 50%, or 100% of the total depth of the concrete.

In certain embodiments, the microbe culture and/or growth byproduct composition can prevent direct contact of the concrete to abrasive elements, such as waves and winds.

Assessing the Concrete

To identify and assess various properties of concrete compositions or concrete coatings, various tests can be performed. These tests can be used to verify that the concrete satisfies structural requirements. Alternatively, these tests can be used to determine the optimal concentrations of the various admixtures to create the desired properties of the concrete.

Absorption Test

Testing the moisture levels in concrete is a common method of determining the water resistance characteristics of the concrete sample. One common absorption test that can be used in the BS 1881-122:2011.

The British Standard (BS) 1881-122:2011 and BS 1881-122:1983 tests measure the amount of water that penetrates into concrete samples when submerged. These tests, along with test variations, are known by practitioners in the art. In these two tests various items can be required including: a balance is used to weigh the specimen; a coring machine is used to cut about a 75 mm diameter core; a drying oven is used at a temperature of about 105° C.; a tank that is at least 125 mm deep, containing clean water maintained at a temperature of about 20° C.; and a dry, airtight vessel that can be used as a desiccator of enough volume to hold three samples to be tested. Each sample is processed according to these art-recognized tests for water permeability.

Rapid Chloride Permeability Test

A rapid chloride permeability test assesses the ability of concrete to resist chloride ion penetration by monitoring the amount of electrical charge passed through cylindrical samples. One example of this test is the Active Standard Test Method (ASTM) C1202. In this test, the electrical charge is passed through the concrete for six hours. The total charge passed through the concrete is related to the specimen's ability to resist chloride ion penetration. Lower levels of charge passed indicate high resistance. Chloride permeability tests are well understood by practitioners in the art.

Water Permeability Test

A water permeability test identifies the depth of water penetration into concrete samples when subjected to hydrostatic pressure. Two examples of water penetration tests, BS (European Standard) EN 12390-8 and DIN 1048 Part 5, test the depth of water penetration when the concrete sample is subjected to 0.5 MPa of hydrostatic pressure over three days. Concrete samples are cast and cured for 28 days and then placed in the testing device. The sample holders are open at both ends, with one end subjected to hydrostatic pressure. After three days, the samples are removed from the testing apparatus, cracked in half vertically and the maximum depth of water penetration is measured.

Because this test measures water penetration into concrete when the water is under hydrostatic pressure, this test is useful for testing concrete to be used in structures such as basements, tunnels, dams, and water reservoirs. If the concrete structure is not intended to be submitted to hydrostatic pressure during its lifetime, this water permeability test can be combined with absorption testing.

Compressive Strength Test

A compressive strength test checks the concrete's ability to perform adequately under the applied static or dynamic loads. Some standard tests are ASTM C31, ASTM C39, ASTM C192, AASHTO T-22, AASHTO T-23, AASHTO T-126, EN 1290-1, EN 12390-2, EN 12390-3, EN 12390-4, and EN 12504-1.

This test may be used to determine the size or structural components needed to accommodate the desired loads, quality control, design mixture approval, and acceptability. The tests can be carried out at the site of concrete application or the tests can be done at a place of production.

To measure the compressive strength, cylindrical or cube concrete specimens are put under a constant rate of loading in a compression testing machine and the breaking load—the load at which the concrete fractures—is measured. The strength is calculated by dividing the breaking load by the cross-sectional area of the specimen, perpendicular to the loading direction. The units of the strength can be psi, $kg/cm^2$, or MPa, amongst other pressure units.

Final test results are derived from the average strength of several specimens casted from the same sample and tested at the same age of curing, generally specified to have fully designed capacity at 28 days (28-day strength). Three consecutive test results must meet or exceed the specified strength and no test must fall below a certain percentage of the specified strength. The necessary equipment besides a compression testing machine is a mold, mixer, testing equipment, and sample curing equipment.

Tensile Strength Test

A tensile strength test determines the resistance of the concrete to fracturing when tension forces are applied. Some standards for this test are ASTM C31, ASTM C78, ASTM C192, AASHTO T-23, AASHTO T-97, AASHTO T-126, EN 12390-5, EN 1339, EN 1340, and EN 1521.

Concrete is not usually designed for an application that requires resistance to direct tension loads as the tensile strength of concrete can be 10 to 15% of compressive strength. There are several types of tensile strength tests that can be used to identify characteristics of the concrete including direct tension force application, flexure, indirect split cylinder tests, and, rarely, uniaxial tension.

The flexure test is a common test that comprises applying a bending load to an unreinforced concrete prism or beam using symmetrical two- or three-point loading. The concrete beam will bend under the load and when the beam fails, the load at that failure point is used to calculate the tensile strength and/or modulus of rupture. In the split cylinder test, a cylindrical specimen is plated with its long axis horizontal between a compression machine's platen and a load is incrementally applied to the side of the specimen until it fails by causing the cylinder to split along its axis.

The necessary equipment is a mold, mixer, testing equipment, and sample curing equipment. For the flexure test, a flexural beam frame or flexural platens are installed on the compression machine. For the split cylinder test, a testing jig and wood strips are required to apply the splitting load.

Density Tests

There are a variety of tests to determine the density of the concrete, primarily by the buoyancy balance method in which the known volume is weighed in both dry and submerged conditions and the yield buckets method in which the fresh concrete sample is placed inside a metal vessel of known volume. The fresh concrete is compacted into the vessel, filled to the top, the top is scraped level, and then weighed. Density is determined by a simple weight-over-volume calculation. Some of the standard tests that can be used are ASTM C29, ASTM C138, AASHTO T-19, AASHTO T-121, EN 12390-7, and EN 1097-3.

The necessary equipment is a mold, mixer, buoyancy balance and frame, scale, tamping rod, strike-off plate, and sample curing equipment.

High-density concrete can be used in casting pretensioned reinforcing elements such as tensioned cables or reinforcement bars. The concrete is poured over the pretensioned cables to provide additional bonding strength between the bars and the concrete. Once the concrete hardens, the bars are released causing compression of the concrete element. This is used on high-strength elements such as bridge girders and pretensioned floor slabs. Low-density concrete and air entrained concrete is used in on-grade floor slabs to improve performance in adverse weather conditions. Concrete density varies depending on the density of its ingredients, including the presence of biosurfactants, aggregate, and cement, as well as its air content.

Slump Tests

The concrete slump test is used to measure the consistency and workability of freshly made concrete as well as the ease with which it flows. Generally, the test shows the water to cement ratio, with higher water contents showing higher slump values. Slump is an indicator of the compressive strength of hardened concrete. In general, for standard weigh concrete, the high the water content, the lower the strength. However admixtures, which can include biosurfactants, can affect the slump value by changing the required water to cement ratio required for the necessary flowability. Some of the standard tests that can be used are ASTM C143, AASHTO T-119, and EN 12350-2.

The test is carried out with a conical-shaped mold called the Slump Cone or Abrams Cone, of standardized dimensions, which is filled with fresh concrete. When the cone is removed, the fresh concrete settles vertically, and the slump value is the measurement of vertical settlement, or slump, from the original height. The necessary equipment is a metal slump cone, tamping rod, slump cone base, tape measure, mold, mixer, testing equipment, and sample curing equipment.

High-flow concrete is used for casting concrete inside heavily reinforced forms to ensure adequate and homogenous mixture is distributed throughout the reinforced concrete element. Therefore, the main purpose of measuring slump is to achieve acceptable workability.

Air Content Tests

The air content tests are used to determine the amount of air within the concrete. The tests usually use the pressure method. Concrete is placed inside a container of known volume and flushed out at the top. The method is based on Boyle's Law, in which the column of air in the void is proportional to the applied pressure. Pressure is applied to the sealed test contained by connecting a separate air chamber equipped with a pump. With the valve closed, the chamber is pressurized to a calibrated operating pressure and the pressure gauge is tared. When the valve is opened, the air in the concrete expands into the test chamber and a gauge provides the reading in units of air content. The necessary equipment is an air entrainment meter, strike-off bar, rubber mallet, mixer, testing equipment, and sample curing equipment. Some of the standard tests that can be used are ASTM C231, AASHTO T-152, and EN 12350-7.

An elevated level of air entrainment in concrete is often necessary in areas where concrete is exposed to cycles of freezing and thawing. Water expands when frozen and this can create internal forces that may exceed the bonded or tensile strength of the concrete element, resulting in cracking. Air in the form of very small bubbles provides void spaces within concrete that act as a reservoir where water can deposit and expand, relieving the internal pressure in the freezing cycle and providing protection to the concrete. Air is homogenously distributed in the concrete mix using mixing blades. Additives are used during the mixing process to stabilize the bubbles of entrained air so that they remain once the concrete has hardened.

Concrete Test Hammer

The test hammer is used to determine the strength of in-situ concrete. The Concrete Test Hammer is also known as the Rebound Hammer or the Schmidt Hammer. The test hammer uses a spring-actuated mass that is released to impact the surface of a concrete sample with a designed amount of energy. The rebound distance following impact is then measured. The hammer is held perpendicular to the surface being tested and the rebound varies according to the hardness of the sample point. This rebound measurement is then converted into compressive strength by means of a conversion chart. Different conversion charts have been generated to compensate for instrument orientation. These charts were developed by carrying out rebound tests on concrete samples before being crushed under compression. The necessary equipment besides a compression testing machine is a mold, mixer, testing equipment, and sample curing equipment.

This is not the standard test for determining compressive strength, as outlined previously. However, the number of concrete specimens being compression tested is often too small to be considered more than random testing. It is also important in many cases to determine the compressive strength of aged concrete elements for structure retrofitting, modeling, and analysis.

Ultrasonic Pulse Velocity Test

The Ultrasonic Concrete Tester can include the measurement of concrete uniformity, determination of the presence or absence of voids, cracks, and other imperfections, deterioration of the concrete that might have occurred due to age or through the action of fire frost or chemical attack, the measurement of layer thickness and elastic modulus, and the determination of concrete strength. To test these parameters, an ultrasonic pulse is passed through concrete; the time of travel is measured.

This test can be performed on finished concrete to assess the quality of that concrete. When a high velocity of the ultrasonic pulse is observed, the concrete is uniform and homogenous throughout, with respect to density or the presence of imperfections. Issues at the surface and the subsurface can be detected with this method.

EXAMPLES

A greater understanding of the present invention and of its many advantages may be had from the following example, given by way of illustration. The following example is illustrative of some of the methods, applications, embodiments, and variants of the present invention. The example is not to be considered as limiting the invention.

Example 1—Increase of Concrete Compressive Strength with Sophorolipid and *W. anomalus*

A combination of biosurfactants and yeast culture improves the strength of concrete. A compressive strength test was used to evaluate the strength of the samples. Each sample comprised Portland cement, sand, and water. Some samples further comprised *W. anomalus* and either lactonic or acidic sophorolipids.

The *W. anomalus* and sophorolipids were added to the conventional concrete mixture that comprises water and QUIKRETE®, in which 150 ml of water is added for every kg of QUIKRETE® without any admixtures in the following test conditions:

1. Control: 0 g/l of *W. anomalus* and 0 ml/l sophorolipids
2. Group 2: 10 g/l of *W. anomalus* and 0.05 ml/l lactonic sophorolipids
3. Group 3: 10 g/l of *W. anomalus* and 0.1 ml/l lactonic sophorolipids
4. Group 4: 10 g/l of *W. anomalus* and 0.3 ml/l acidic sophorolipids
5. Group 5: 10 g/l of *W. anomalus* and 0.1 ml/l acidic sophorolipids
6. Group 6: 10 g/l of *W. anomalus* and 0.05 ml/l acidic sophorolipids The concrete mixtures, with or without the yeast and biosurfactants, are poured into cylinders having constant diameters of 50 mm and heights of 100 mm. The concrete samples are dried at room temperature (22° C.) for 27 days.

To determine the compressive strength of each concrete sample, the TORBAL FB High Resolution Precision Force Gauge was used. Each concrete sample cylinder was placed vertically on a stand where the gauge was leveled and tared. Compression was applied until the cylinder cracked full and a force could no longer be measured. The resulting maximum force was recorded in Table 1. Each test condition was performed in triplicate. The average resulting maximal compressive force was determined for each trial condition.

TABLE 1

| | Compressive force test of concrete | | | | | |
|---|---|---|---|---|---|---|
| Group | Control *W. anomalus*: 0 g/l lactonic SLP: 0 ml/l 1 | *W. anomalus*: 10 g/l lactonic SLP: 0.05 ml/l 2 | *W. anomalus*: 10 g/l lactonic SLP: 0.1 ml/l 3 | *W. anomalus*: 10 g/l acidic SLP: 0.3 ml/l 4 | *W. anomalus*: 10 g/l acidic SLP: 0.1 ml/l 5 | *W. anomalus*: 10 g/l acidic SLP: 0.05 ml/l 6 |
| Trial A | 26.9 | 32.9 | 17.7 | 21.03 | 18.4 | 11.2 |
| Trial B | 26.7 | 31.4 | 27.9 | 24.98 | 21.2 | 10.33 |
| Trial C | 23.7 | 29.5 | 18.9 | 21.7 | 23.8 | 9.17 |
| Average | 25.7 | 31.2 | 21.5 | 22.57 | 21.1 | 10.2 |

Based on the results illustrated in Table 1, the concrete mixture with 10 g/l of *W. anomalus* and 0.05 ml/l of lactonic sophorolipids had a compressive strength 21.4% higher than the control concrete that did not have either the yeast cells or the sophorolipids.

What is claimed:

1. An improved concrete composition, wherein the composition comprises a microbe culture comprising an inactive *Starmerella bombicola* or *Wickerhamomyces anomalus* yeast, a sophorolipid biosurfactant and a concrete mixture.

2. The composition of claim 1, wherein the concrete mixture comprises water, aggregate, and cement;
   wherein the aggregate is selected from one or a combination of the following: sand, gravel, stone, rock, blast furnace slag, glass, and recycled concrete.

3. The composition of claim 1, wherein the sophorolipid is present in the composition at a concentration of about 0.001% to about 5%.

4. The composition of claim 1, wherein the microbe culture is present in the composition at a concentration of about 0.1 g/l to about 100 g/l.

5. The composition of claim 1, wherein the biosurfactant is a lactonic sophorolipid.

6. The composition of claim 1, wherein the concrete further comprises at least one ingredient selected from:
   a) accelerators;
   b) bonding agents;
   c) corrosion inhibitors;
   d) air entraining agents;
   e) crystalline admixtures;
   f) pigments;
   g) plasticizers;
   h) superplasticizers;
   i) pumping aids;
   j) retarders;
   k) water-reducing admixtures;
   l) shrinkage reducers;
   m) hydration-control admixtures;
   n) alkali-silica reactivity inhibitors;
   o) damp-proofing admixtures;
   p) permeability reducing admixtures;
   q) gas-forming admixtures;
   r) anti-washout admixtures;
   s) foaming admixtures; and
   t) workability admixtures.

7. A method for improving one or more properties of concrete, wherein the method comprises adding to the concrete a microbe culture comprising an inactive *Starmerella bombicola* or *Wickerhamomyces anomalus* yeast and a sophorolipid biosurfactant.

8. The method of claim 7, wherein the concrete comprises water, aggregate, and cement.

9. The method of claim 8, wherein the concrete further comprises a concrete admixture selected from:
   a) accelerators;
   b) bonding agents;
   c) corrosion inhibitors;
   d) air entraining agents;
   e) crystalline admixtures;
   f) pigments;
   g) plasticizers;
   h) superplasticizers;
   i) pumping aids;
   j) retarders;
   k) water-reducing admixtures;
   l) shrinkage reducers;
   m) hydration-control admixtures;
   n) alkali-silica reactivity inhibitors;
   o) damp-proofing admixtures;
   p) permeability reducing admixtures;
   q) gas-forming admixtures;
   r) anti-washout admixtures;
   s) foaming admixtures; and
   t) workability admixtures.

10. The method of claim 8, wherein the aggregate is selected from one or a combination of the following: sand, gravel, stone, rock, blast furnace slag, glass, and recycled concrete.

11. The method of claim 7, wherein the biosurfactant is a lactonic sophorolipid.

12. The method of claim 7, wherein the sophorolipid is present at a concentration of about 0.001% to about 50%.

13. The method of claim 7, wherein the microbe culture is present in the composition at a concentration of about 0.1 g/l to about 100 g/l.

14. The method of claim 7, wherein the concrete is improved by one or a combination of the following:
   a) increasing the strength of the concrete;
   b) decreasing the amount of water used in the concrete composition;
   c) increasing the workability of the concrete;
   d) decreasing the porosity of the concrete;
   e) modifying the curing time of concrete; and
   f) increasing the tolerance of the concrete to one of more environmental stresses, said one or more environmental stresses being selected from biotic stresses and abiotic stresses.

15. The method of claim 7, wherein the concrete, growth byproduct, and/or microbe culture are mixed together before application of the concrete.

16. The method of claim 7, wherein the concrete is curing when the microbe culture and/or growth byproducts are applied to the concrete.

17. A method for improving one or more properties of concrete, wherein the method comprises adding to the concrete a microbe culture comprising an inactive *Starmerella bombicola* or *Wickerhamomyces anomalus* yeast and a sophorolipid biosurfactant, wherein the concrete is curing when the microbe culture and/or biosurfactant is applied to the concrete.

* * * * *